(12) United States Patent
Melaragni

(10) Patent No.: US 7,970,062 B1
(45) Date of Patent: Jun. 28, 2011

(54) METHOD FOR DISTRIBUTING HIGH AND LOW-BANDWIDTH VOICE CHANNELS USING A MINIMUM NUMBER OF TIMESLOTS

(75) Inventor: William Melaragni, Billerica, MA (US)

(73) Assignee: Avaya Inc., Basking Ridge, NJ (US)

( * ) Notice: Subject to any disclaimer, the term of this patent is extended or adjusted under 35 U.S.C. 154(b) by 1238 days.

(21) Appl. No.: 11/485,891

(22) Filed: Jul. 13, 2006

(51) Int. Cl.
*H04B 14/04* (2006.01)

(52) U.S. Cl. .................. 375/242; 375/240.25; 704/200

(58) Field of Classification Search .............. 375/242, 375/240.25; 704/200
See application file for complete search history.

(56) References Cited

U.S. PATENT DOCUMENTS

| | | | | | |
|---|---|---|---|---|---|
| 5,068,899 | A | * | 11/1991 | Ellis et al. | 704/212 |
| 5,220,422 | A | * | 6/1993 | Oh | 375/240.11 |
| 5,828,849 | A | * | 10/1998 | Lempel et al. | 709/247 |
| 6,182,102 | B1 | * | 1/2001 | Ramachandran et al. | 708/313 |
| 6,650,662 | B1 | * | 11/2003 | Arnaud et al. | 370/526 |
| 2003/0115044 | A1 | * | 6/2003 | Sung et al. | 704/201 |
| 2005/0249272 | A1 | * | 11/2005 | Kirkeby et al. | 375/232 |

* cited by examiner

*Primary Examiner* — Curtis B Odom
(74) *Attorney, Agent, or Firm* — Chapin IP Law, LLC; David W. Rouille, Esq.

(57) ABSTRACT

A method and apparatus for distributing high-bandwidth and low-bandwidth voice channels is presented. An input signal is received and separated into a first low-band signal and a first high-band signal. The first low-band signal is compressed to provide a low-bandwidth channel and is used to carrying encoded voice signals (e.g. G.711). The high-band signal is also compressed to provide a high-bandwidth channel and is used to carry encoded voice signals (e.g. G.722).

19 Claims, 4 Drawing Sheets

METHOD FOR DISTRIBUTING HIGH AND LOW-BANDWIDTH VOICE CHANNELS USING A MINIMUM NUMBER OF TIMESLOTS

BACKGROUND

G.711 is the international standard for encoding telephone audio on 64 kbps channel. G.711 is a pulse code modulation (PCM) scheme operating at an 8 kHz sample rate, with 8 bits per sample. G.711 is an ITU-T standard for audio companding, and is primarily used in telephony. According to the Nyquist theorem, which states that a signal must be sampled at twice its highest frequency component, G.711 can encode frequencies between 0 and 4 kHz. G.711 is a standard to represent 8 bit compressed pulse code modulation (PCM) samples for signals of voice frequencies, sampled at the rate of 8000 samples/second and 8 bits per sample. A G.711 encoder will thus create a 64 kbit/s bitstream.

G.722 is an ITU-T standard wideband speech codec operating at 32-64 kbit/s. G.722 offers lower bit-rate compressions than G.711. The unencoded signal is 14 bits at 16 KHz, producing an effective bandwidth of 50 Hz to 7000 Hz (per the G.722 standard).

There are two different companding variants of G.711: μ-law (a.k.a. "Mu-Law") and A-law. The μ-law algorithm is used in North America & Japan and A-law algorithm is used in Europe and the rest of the world. Both are logarithmic, but the A-law was specifically designed to be simpler for a computer to process. The standard also defines a sequence of repeating code values which defines the power level of 0 dB.

In digital signal processing, a Quadrature Mirror Filter (QMF) is used to split an input signal into bands (e.g., a high band and a low band) which are then usually sub-sampled by a factor of two. The QMF includes a high-pass filter and a low-pass filter wherein the sum of the magnitudes response of the filters is equal to one at every frequency.

SUMMARY

Conventional mechanisms such as those explained above suffer from a variety of deficiencies. One such deficiency is that conventional products allocate enough timeslots to support both G.711 and G.722 talkers. Somewhere in the system—often a single board, but can be distributed—the conversion is performed. Since G.711 ("low bandwidth") and G.722 ("high bandwidth") channels are run to and from the common conversion device, a maximum number of timeslots is consumed. Not only does this consume precious resources (timeslots), it reduces the effectiveness of a certain style conferencing mechanism (one in which every voice source has its own talk path and all conferencing summation is performed at the egress point). Since G.722 and G.711 are not inherently compatible, it is not possible for a G.711-optimized conferencing summation to include G.722 channels, unless they are first converted to G.711 (adding cost and reducing overall system capacity).

Techniques exist (for example, ADPCM) to reduce the number of time slots consumed by G.722 voice channels, but it does nothing to allow the interoperation of High and Low-bandwidth streams.

Embodiments of the invention significantly overcome such deficiencies and provide mechanisms and techniques that reduces to a minimum the number of timeslots required to transport G.722 wideband voice traffic while providing compatibility with G.711 voice processing elements.

In a particular embodiment of a method for distributing high-bandwidth and low-bandwidth voice channels, the method includes receiving an input signal and separating the input signal into a first low-bandwidth signal and a first high-bandwidth signal. The method further includes compressing the first low-bandwidth signal to provide a low-bandwidth channel and carrying encoded voice signals on the low-bandwidth channel. The method also includes compressing the first high-bandwidth signal to provide a high-bandwidth channel and carrying encoded voice signals on the high-bandwidth channel.

Other embodiments comprise a Private Branch Exchange (PBX), wherein the PBX includes a modified Quadrature Mirror Filter (QMF) having a decomposition portion and a reconstruction portion, the decomposition portion receiving an input signal and separating the input signal into a first high-band signal and a first low-band signal. The modified QMF also includes a first compander having a first compander compression portion and a first compander expander portion, the first compander compression portion receiving the first low-band signal and compressing the first low-band signal to produce a low-bandwidth channel, the first compander expander portion receiving the low-bandwidth channel and producing a second low-band signal. Additionally, the PBX includes a converter having a converter compression portion and a converter expander portion, the converter compression portion receiving the first high-band signal and compressing the first high-band signal to produce a high-bandwidth channel, the converter expander portion receiving the high-bandwidth channel and producing a second high-band signal and wherein the reconstruction portion of the QMF receives the second low-band signal and the second high-band signal and produces an output signal from the second low-band signal and the second high-band signal.

It is to be understood that the embodiments of the invention can be embodied strictly as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
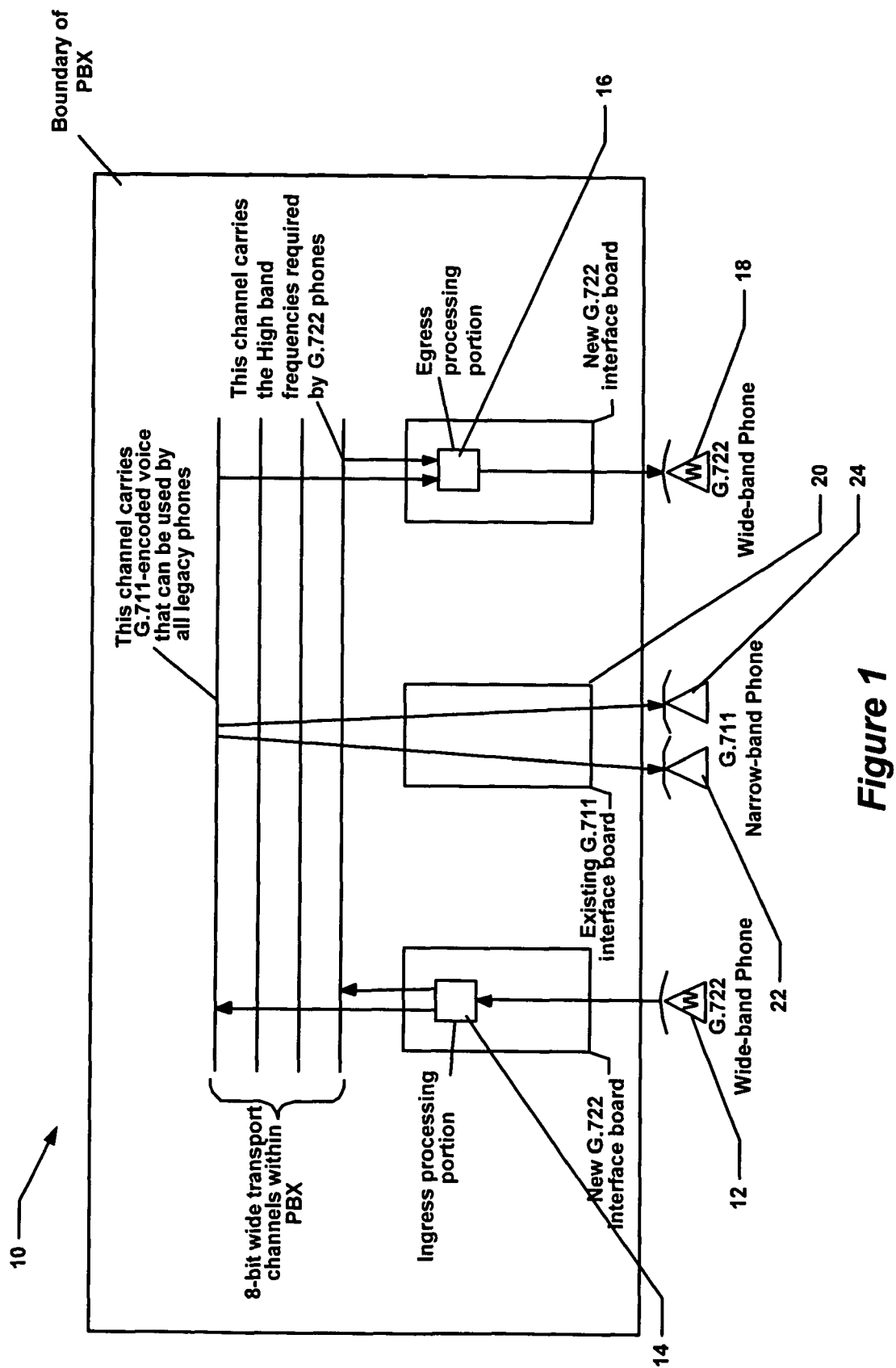
FIG. 1 comprises a block diagram of a PBX wherein distribution of high-bandwidth and low-bandwidth voice channels using a minimum number of timeslots is preformed in accordance with embodiments of the invention.

Older generation PBX and other voice processing systems are often optimized to support G.711 bandwidth (approximately 3.5 KHz) voice channels. Recent market trends have shown that higher bandwidth voice channels are required for a particular customer segment (some conferencing services, some contact/call centers). A popular high-bandwidth codec exists (G.722) that provides upwards of 7 KHz bandwidth. The challenge to date for legacy PBX vendors has been the upgrade of existing PBX systems to support G.722 bandwidth channels. The most common approach is to consume 4 64 kbps timeslots per every G.722 talk path, as compared to one 64 kbps timeslot required per G.711 talk path. It can be seen that the addition of G.722 channels can quickly exhaust the limited number of timeslots available within a PBX (for example, a PBX may only have approximately 480 timeslots available for voice channels).

Beyond the issue of timeslot consumption required for the higher bandwidth voice traffic is the inability of non-G.722-capable interface boards to process G.722 traffic. Therefore, if a G.722 phone call is made to a G.711-only user, a conversion must be performed somewhere in the PBX. Because of this, even more timeslots are consumed by the need to move the G.722 and G.711 channels into a conversion device, and then to move the converted voice channels back to the appropriate interface boards.

In certain PBXs, multi-party conferencing is based on the transport of G.711 voice streams. The PBX defines a talk path timeslot for each G.711 source. All G.711 "listeners" have the ability to sum together a number of talk paths, thus creating the basis for conferencing. In this system, G.722 channels cannot be summed with G.711 channels so easily—the G.722 channels must first be converted to G.711. Adding G.722 voice to a PBX causes the loss of conferencing efficiency unless other steps are taken.

Described is a mechanism to transport G.722 and G.711 voice channels in such a manner that the number of timeslots consumed inside the PBX is reduced. Further, the native conferencing capability of the PBX is preserved, or at least it is minimally impacted.

By implementing a structure known as a Quadrature Mirror Filter (QMF), the frequency components of a signal are separated into multiple bands. For this invention, the number of bands is two, and they are designated "High" and "Low". The G.722 7 KHz stream is run through a QMF, with the Low band being compatible with a G.711 voice channel. This allows one voice stream (G.722) to support both High and Low-bandwidth devices. In order to further reduce the number of time slots consumed by the voice channel, companding and/or down converting is employed in both the High and Low frequency bands.

Companding (compression and expansion) is a method commonly used in telephony applications to increase dynamic range while keeping the number of bits used for quantization constant. µ-law is a companding standard commonly used in the United States. µ-law takes 14-bit data values and compresses them to eight-bit values. A-law is the standard used in Europe. A-law takes 13-bit data values and compresses them to eight-bit values.

The presently described distribution of high-bandwidth and low-bandwidth voice channels using a minimum number of timeslots maintains compatibility with G.711 voice processing equipment, which preserves a Customer's investment. Newer, G.722-capable boards bear the implementation complexity. Such newer designs benefit from recent improvements in Digital Signal Processing (DSP) and Field Programmable Gate Arrays (FPGAs) silicon.

Prior art devices implements the transport of G.722 using four 64 kbps timeslots. In order to provide interoperability with G.711 devices, a centralized conversion function bridges between G.722 and G.711 traffic. The present invention provides a mechanism by which G.722 and G.711 interoperability is supplied yet no system-wide dedicated conversion function is utilized. The inherent efficiencies of G.711 transport are thus preserved.

Referring now to FIG. 1 a high-level block diagram of a PBX capable of performing distribution of high-bandwidth and low-bandwidth voice channels using a minimum number of timeslots is presented. The PBX 10 includes a first G.722 interface board which is capable of interfacing with a first wide-band phone 12 (G.722). The first G.722 interface board includes an ingress processing portion 14 also referred to herein as a decomposition portion of a Quadrature Mirror filter (QMF). Within the PBX 10 is a plurality of 8-bit wide transport channels. One of the channels is in communication with the first G.722 interface board and comprises a high band channel carrying high band frequencies required by G.722 phones. Another channel of the plurality of channels comprises a low band channel that carries G.711 encoded voice signals. A G.711 interface board 20 is shown in communication with the low band channel. Conventional narrow-band phones 22 and 24 are capable of communication with the G.711 interface board. Also shown is a second G.722 board having an egress processing portion 16, also referred to herein as a reconstruction portion of a QMF. The second G.722 interface board is in communication with a second G.722 phone 18. By way of the present distribution of high-bandwidth and low-bandwidth voice channels using a minimum number of timeslots, both G.711 and G.722 devices can be used with the same PBX, and results in minimum usage of timeslots. While FIG. 1 shows only one half of the duplex voice flow, it should be appreciated that the opposite flow is the logical inverse of this flow.

Figure 2:
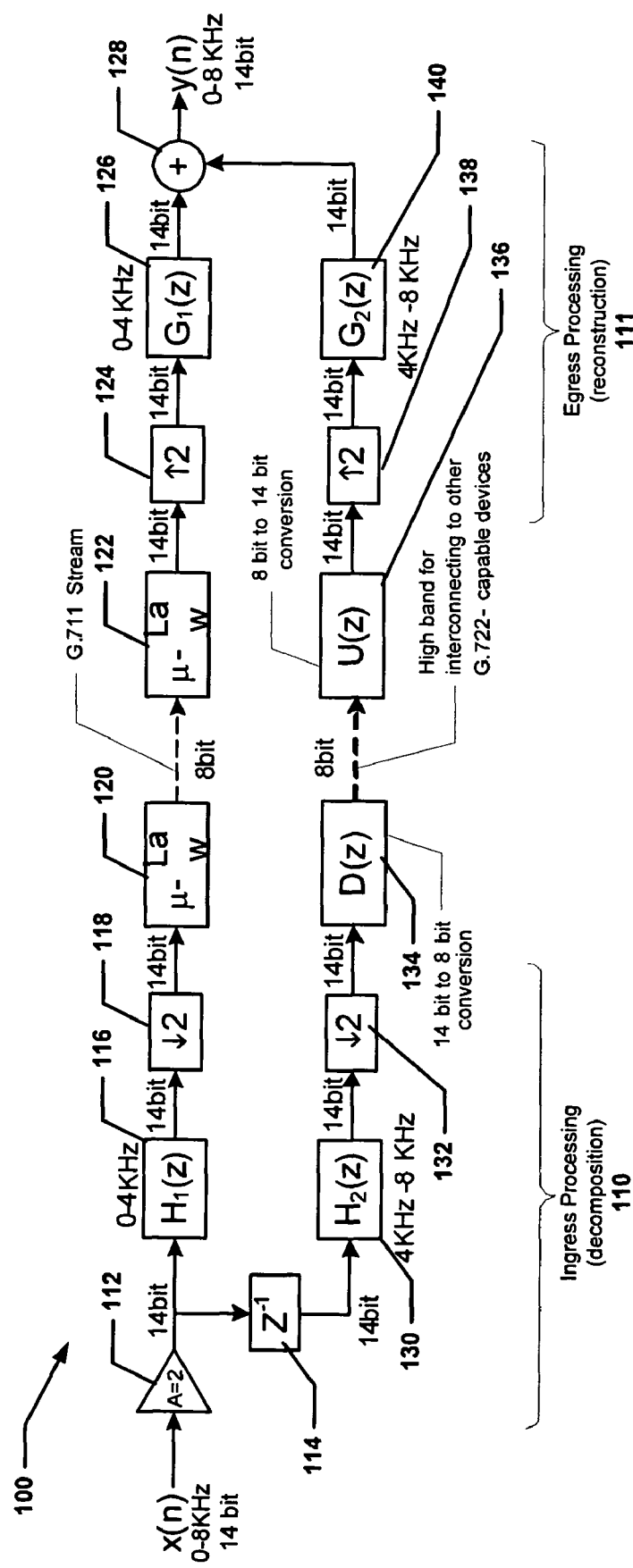
FIG. 2 comprises a block diagram of a portion of a PBX distribution of high-bandwidth and low-bandwidth voice channels using a minimum number of timeslots in accordance with embodiments of the invention.

Referring now to FIG. 2, a block diagram of the modified QMF 100 is shown. The modified QMF 100 includes an ingress processing portion 110 and an egress processing portion 111 and further includes a compander including a compressor and an expander, as well as a converter disposed between the ingress processing portion 110 of the QMF and the egress processing portion 111 of the QMF.

An input signal is received by ingress processing portion 110 of the modified QMF 100 at amplifier 112. This input signal comprises a 0-8 KHz, 14 bit signal. Amplifier 112 receives the input signal and produces an amplified signal which is supplied by amplifier 112 to a first low-pass filter 116. The first low-pass filter 116 receives the amplifier output signal and produces a first low-pass signal. This signal is a 0-4 KHz 14 bit signal, and is supplied to a first down-sampler 118. The first down-sampler 118 receives the low-pass signal and provides a first low-band signal.

The amplified signal from amplifier 112 is also provided to delay 114. Delay 114 provides a one sample delay, as required by the filter. The delay 114 produces a delayed signal. The delayed signal is provided to a first high-pass filter 130 coupled to the output of delay 114.

The first high-pass filter 130 receives the delayed signal and produces a high-pass signal. The high-pass signal is provided to a second down-sampler 132 coupled to the high-pass filter. The second down-sampler 132 receives the high-pass signal and produces a first high-band signal.

The above described amplifier 112, first low-pass filter 116, first down-sampler 118, delay 114, first high-pass filter 130 and second down-sampler 132 comprise the ingress processing portion or decomposition portion of the modified QMF 100.

The first low-bandwidth signal from first down-sampler 118 is provided to a first compander having a first compander compression portion 120 and a first compander expander portion 122. The first compander compression portion 120 receives the first low-band signal and compresses the first low-band signal to produce a low-bandwidth channel. The low-bandwidth channel comprises an 8 bit G.711 stream for carrying encoded voice that can be used by other devices communicating with the PBX. The compander also includes an expander portion 122 that receives the low-bandwidth channel and produces a second low-band signal.

A converter having a compression portion 134 and an expander portion 136 is interfaced between the decomposition portion and reconstruction portion of modified QMF 100. The converter compression portion 134 receives the first high-band signal from second down converter 132 and compresses the first high-band signal to produce a high-bandwidth channel. The high-bandwidth channel comprises an 8 bit high-band decomposed portion of a G.722 stream for carrying encoded voice that can be used by other devices communicating with the PBX. The converter also includes an expander portion 136 which receives the high-bandwidth channel and produces a second high-band signal.

The second low-band signal and the second high-band signal are received by the reconstruction portion 111 of the modified QMF 100. The reconstruction portion of the QMF includes a first up-sampler 124 which receives the second low-bandwidth signal and provides an up-sampled low-band signal. A second low-pass filter 126 is coupled to the first up-sampler 124. The second low-pass filter 126 receives the up-sampled low-band signal and provides a filtered low-band signal.

A second up-sampler 138 receives the second high-bandwidth signal and provides an up-sampled high-band signal. A second high-pass filter 140 is coupled to the second up-sampler. 138. The second high-pass filter 140 receives the up-sampled high-band signal and produces a filtered high-band signal. A combiner 128 is coupled to the second low-pass filter 126 and the second high-pass filter 140 and receives the filtered low-band signal and the filtered high-band signal and produces an output signal from the filtered low-band signal and the filtered high-band signal.

By way of the above described PBX, which includes a modified QMF, low-bandwidth and high-bandwidth voice channels are distributed within a PBX using a minimum amount of timeslots and maintaining compatibility with low-bandwidth voice processing elements.

Figure 3A:
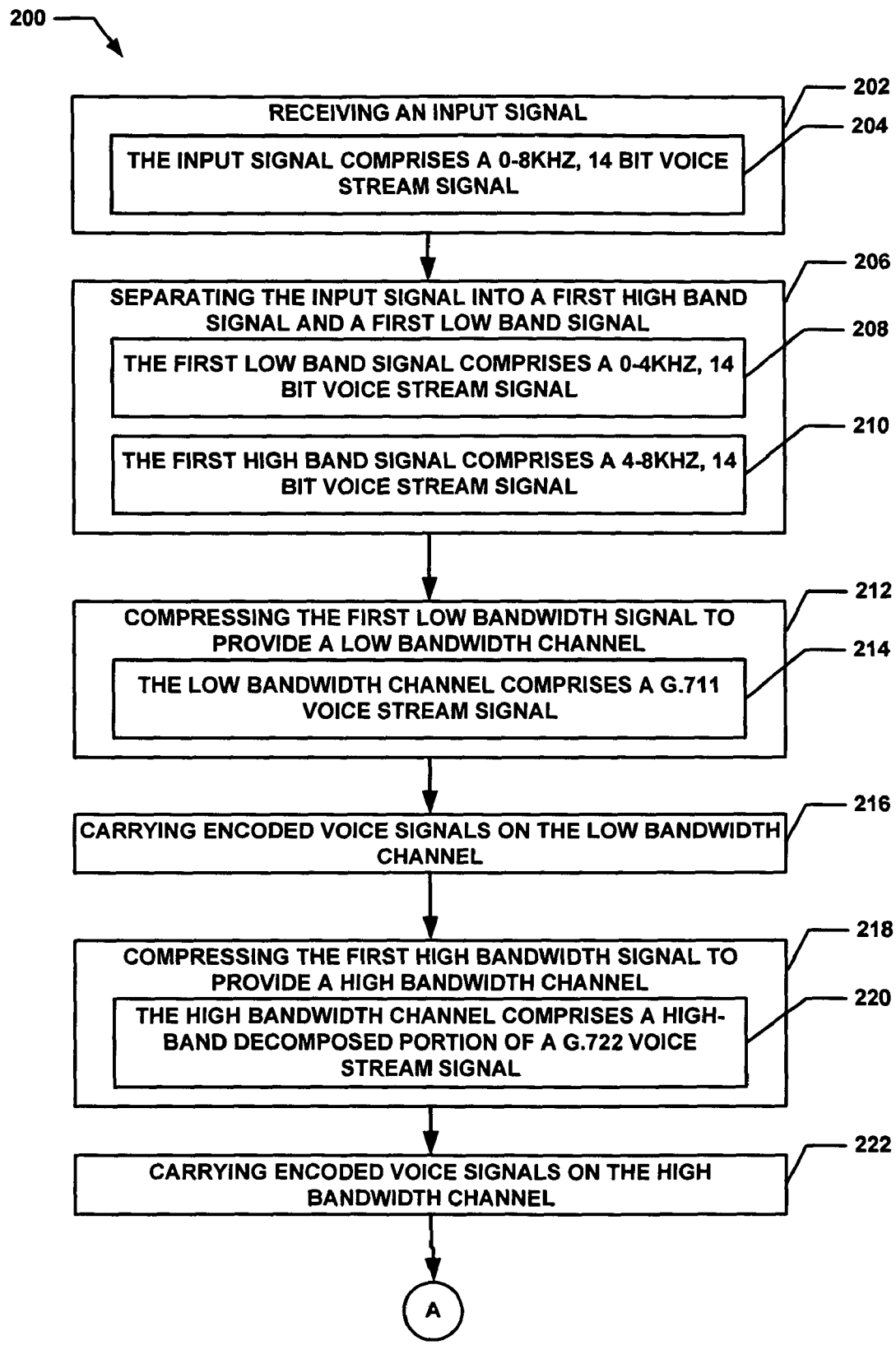
FIG. 3 comprises a flow diagram of a particular embodiment of a method for distribution of high-bandwidth and low-bandwidth voice channels using a minimum number of timeslots in accordance with embodiments of the invention.
Figure 3B:
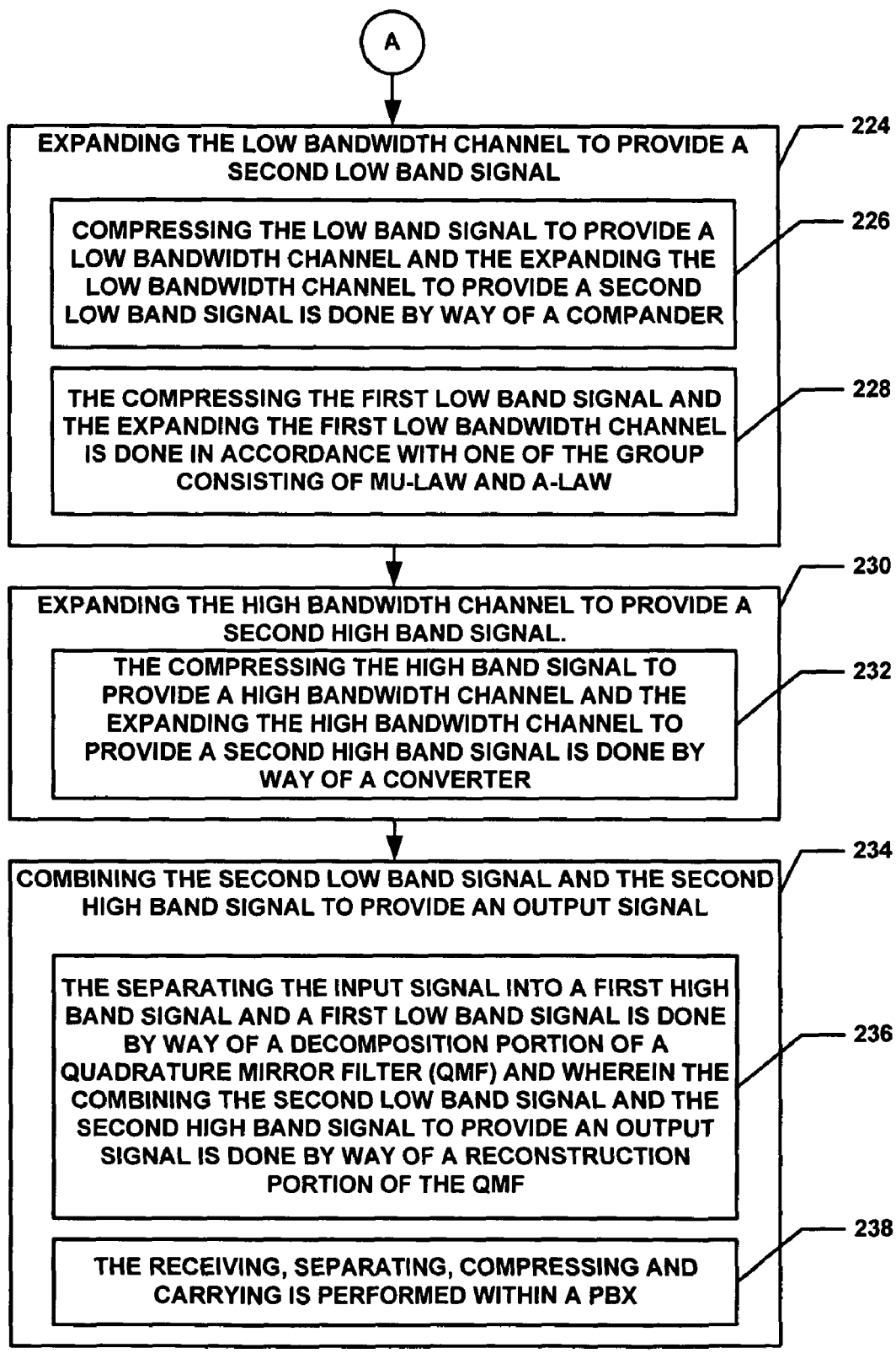

A flow chart of the presently disclosed method of distribution of high-bandwidth and low-bandwidth voice channels using a minimum number of timeslots depicted in FIGS. 3A and 3B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A and 3B, a particular embodiment of a method 200 of distributing high-bandwidth and low-bandwidth voice channels using a minimal amount of time slots is shown. The method begins with processing block 202 which discloses receiving an input signal. As further recited in processing block 204, the input signal comprises a 0-8 KHz, 14 bit voice stream signal.

Processing block 206 states separating the input signal into a first high-band signal and a first low-band signal. The first low-bandwidth signal comprises a 0-4 KHz, 14 bit voice stream signal, as depicted in processing block 208, while the first high-band signal comprises a 4-8 KHz, 14 bit voice stream signal as recited in processing block 210.

Processing continues with processing block 212 which recites compressing the first low-band signal to provide a low-bandwidth channel. As stated in processing block 214, the low-bandwidth channel comprises a G.711 voice stream signal.

Processing block 216 discloses carrying encoded voice signals on the low-bandwidth channel. The low-bandwidth channel is distributed through the PBX and can be used by all G.711 devices.

Processing block 218 states compressing the first high-band signal to provide a high-bandwidth channel. As stated in processing block 220, the high-bandwidth channel comprises a high-band decomposed portion of a G.722 voice stream signal.

Processing block 222 discloses carrying encoded voice signals on the high-bandwidth channel. The high-bandwidth channel is distributed through the PBX and can be used by all G.722 devices.

Processing block 224 discloses expanding the low-bandwidth channel to provide a second low-band signal. The compressing the low-bandwidth signal to provide a low-bandwidth channel and the expanding the low-bandwidth channel to provide a second low-band signal is done by way of a compander, as shown in processing block 226. As further recited in processing block 228, the compressing the first high-bandwidth signal and the expanding the first high-bandwidth signal is done in accordance with one of the group consisting of µ-law and A-law.

Processing block 230 states expanding the high-bandwidth channel to provide a second high-bandwidth signal. Processing block 232 recites the compressing the high-bandwidth signal to provide a high-bandwidth channel and the expanding the high-bandwidth channel to provide a second high-bandwidth signal is done by way of a converter.

Processing block 234 discloses combining the second low-band signal and the second high-band signal to provide a 0 to 8 KHz output signal. Processing block 236 states wherein the separating the input signal into a first high-band signal and a first low-band signal is done by way of a decomposition portion of a Quadrature Mirror Filter (QMF) and wherein the combining the second low-band signal and the second high-band signal to provide an output signal is done by way of a reconstruction portion of the QMF. Processing block 238 states the receiving, separating, compressing, carrying and combining is performed within a private branch exchange (PBX).

The above described method reduces to a minimum the number of timeslots required to transport G.722 wideband voice traffic while providing compatibility with G.711 voice processing elements within a PBX.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of distributing high-bandwidth and low-bandwidth voice channels comprising:
    receiving an input signal;
    separating the input signal into a first high-band signal and a first low-band signal, wherein the separating the input signal into a first high-band signal and a first low-band signal is done by way of a decomposition portion of a Quadrature Mirror Filter (QMF), wherein the decomposition portion of the QMF comprises:
        an amplifier receiving the input signal and providing an amplifier output signal;
        a first low-pass filter coupled to the output of the amplifier, the first low-pass filter receiving the amplifier output signal and producing a low-pass signal;
        a first down-sampler coupled to the low-pass filter, the first down-sampler receiving the low-pass signal and providing the first low-bandwidth signal;
        a delay coupled to the amplifier and receiving the amplifier output signal, the delay producing a delayed signal;
        a first high-pass filter coupled to the output of the delay, the first high-pass filter receiving the delayed signal and producing a high-pass signal; and
        a second down-sampler coupled to the high-pass filter, the second down-sampler receiving the high low-pass signal and providing the first high-bandwidth signal;
    compressing the first low-band signal to provide a low-bandwidth channel; and
    carrying encoded voice signals on the low-bandwidth channel.

2. The method of claim 1 further comprising:
    compressing the first high-band signal to provide a high-bandwidth channel; and
    carrying encoded voice signals on the high-bandwidth channel.

3. The method of claim 2 further comprising expanding the low-bandwidth channel to provide a second low-band signal.

4. The method of claim 3 further comprising expanding the high-bandwidth channel to provide a second high-band signal.

5. The method of claim 4 further comprising combining the second low-band signal and the second high-band signal to provide an output signal.

6. The method of claim 1 wherein the input signal comprises a 0-8 KHz, 14 bit voice stream signal.

7. The method of claim 1 wherein the first low-band signal comprises a 0-4 KHz, 14 bit voice stream signal.

8. The method of claim 1 wherein the first high-band signal comprises a 4-8 KHz, 14 bit voice stream signal.

9. The method of claim 1 wherein the low-bandwidth channel comprises a G.711 voice stream signal.

10. The method of claim 2 wherein the high-bandwidth channel comprises a high-band decomposed portion of a G.722 voice stream signal.

11. The method of claim 5 wherein the receiving, separating, compressing, carrying and combining is performed within a private branch exchange (PBX).

12. The method of claim 5 wherein the combining the second low-band signal and the second high-band signal to provide an output signal is done by way of a reconstruction portion of the QMF.

13. The method of claim 3 wherein the compressing the low-band signal to provide a low-bandwidth channel and the expanding the low-bandwidth channel to provide a second low-band signal is done by way of a compander.

14. The method of claim 13 wherein the compressing the high-band signal to provide a high-bandwidth channel and the expanding the high-bandwidth channel to provide a second high-band signal is done by way of a converter.

15. The method of claim 4 wherein the compressing the first low-band signal and the expanding the first low-bandwidth signal is done in accordance with one of the group consisting of µ-law and A-law.

16. A private branch exchange (PBX) comprising:
    a Quadrature Mirror Filter (QMF) having a decomposition portion and a reconstruction portion, the decomposition portion receiving an input signal and separating the input signal into a first high-band signal and a first low-band signal, wherein the decomposition portion of the QMF comprises:
        an amplifier receiving the input signal and providing an amplifier output signal;
        a first low-pass filter coupled to the output of the amplifier, the first low-pass filter receiving the amplifier output signal and producing a low-pass signal;
        a first down-sampler coupled to the low-pass filter, the first down-sampler receiving the low-pass signal and providing the first low-bandwidth signal;
        a delay coupled to the amplifier and receiving the amplifier output signal, the delay producing a delayed signal;
        a first high-pass filter coupled to the output of the delay, the first high-pass filter receiving the delayed signal and producing a high-pass signal; and
        a second down-sampler coupled to the high-pass filter, the second down-sampler receiving the high low-pass signal and providing the first high-bandwidth signal;
    a first compander having a first compander compression portion and a first compander expander portion, the first compander compression portion receiving the first low-band signal and compressing the first low-band signal to produce a low-bandwidth channel, the first compander expander portion receiving the low-bandwidth channel and producing a second low-band signal;
    a converter having a converter compression portion and a converter expander portion, the converter compression portion receiving the first high-band signal and compressing the first high-band signal to produce a high-bandwidth channel, the converter expander portion receiving the high bandwidth channel and producing a second high-band signal; and
    wherein the reconstruction portion of the QMF receives the second low-band signal and the second high-band signal and produces outputs an output signal from the second low-band signal and the second high-band signal.

17. The PBX of claim 16 wherein the reconstruction portion of the QMF comprises:

a first up-sampler receiving the second low-band signal and providing an up-sampled low-band signal;

a second low-pass filter coupled to the first up-sampler, the second low-pass filter receiving the up-sampled low-band signal and producing a filtered low-band signal;

a second up-sampler receiving the second high-band signal and providing an up-sampled high-band signal;

a second high-pass filter coupled to the second up-sampler, the second high-pass filter receiving the up-sampled high-band signal and producing a filtered high-band signal; and a combiner coupled to the second low-pass filter and the second high-pass filter and receiving the filtered low-band signal and the filtered high-band signal and producing an output signal from the filtered low-band signal and the filtered high-band signal.

18. The PBX of claim 16 wherein the first compander is selected from the group consisting of μ law, and A-law.

19. The PBX of claim 16 wherein the low-bandwidth channel comprises a G.711 voice stream and wherein the high-bandwidth channel comprises a high-band decomposed portion of a G. 722 voice stream.

* * * * *